W. M. WALKER.
CONCRETE PIPE.
APPLICATION FILED JULY 6, 1920.
1,387,025.
Patented Aug. 9, 1921.
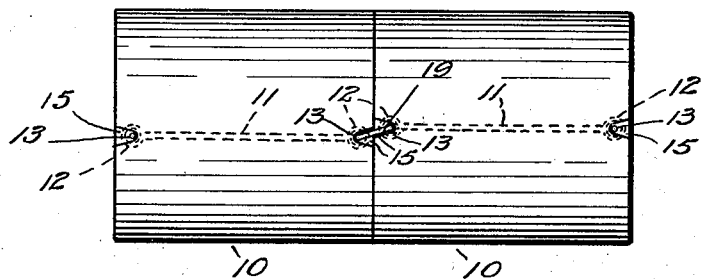
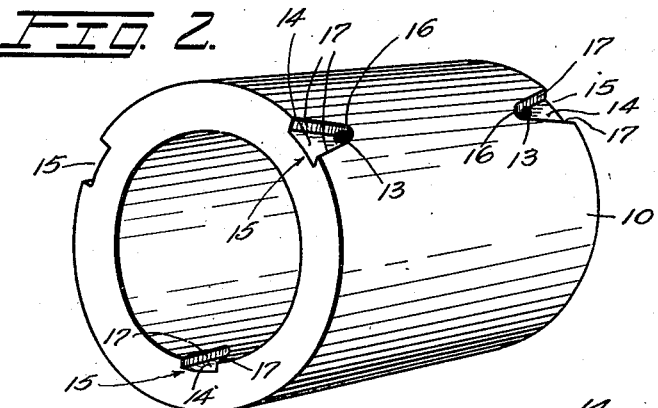
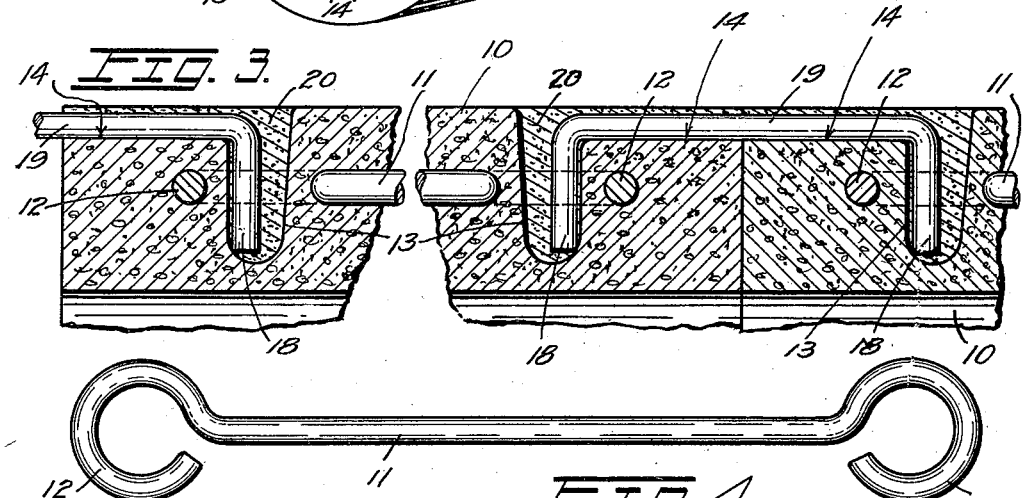
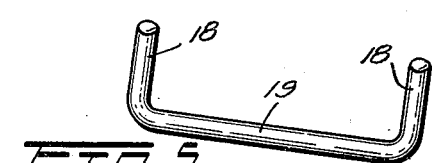
Inventor:
William M. Walker
By his Attorney
Pierre Barnes

UNITED STATES PATENT OFFICE.

WILLIAM M. WALKER, OF SEATTLE, WASHINGTON.

CONCRETE PIPE.

1,387,025.   Specification of Letters Patent.   Patented Aug. 9, 1921.

Application filed July 6, 1920. Serial No. 394,018.

*To all whom it may concern:*

Be it known that I, WILLIAM M. WALKER, a citizen of the United States, residing at Seattle, in the county of King and State of Washington, have invented certain new and useful Improvements in Concrete Pipe, of which the following is a specification.

This invention relates to concrete pipes for use in sewers, drains or analogous applications.

The object of my invention is, first, to produce an inexpensively constructed and strong pipe of reinforced concrete formed in lengths convenient to handle; second, to provide a pipe of this character with metal coupling devices which may readily be applied to secure the pipe members together and, third, to construct a pipe with novel form of receptacles at its ends to accommodate coupling devices so as to enable the pipe members to be readily joined together.

With these ends in view and others, as will appear from the following description, the invention consists in the novel construction, adaptation and combination of parts as will be hereinafter described and claimed.

In the accompanying drawings, Figure 1 is a side elevational view of two coupled pipe units according to the invention. Fig. 2 is a perspective view of a pipe unit, such as shown in Fig. 1. Fig. 3 is a detail longitudinal section illustrating the construction of a pipe embodying the present invention. Fig. 4 is a side elevational view of one of the reinforcing rods; and Fig. 5 is a similar view of a coupling rod.

In carrying out the invention, I form a pipe of a number of concrete tubular sections or units 10 composed of sand, gravel and cement, or it may be made of a clayey material such as terra cotta.

Each pipe unit 10 is formed in a suitable mold to embed in the plastic material a plurality of longitudinally disposed reinforcing rods 11 having end loops 12 and of lengths somewhat less than the length of the respective pipe unit. A pipe unit 10 is formed with a pocket 13 within the material inclosed by each rod loop 12 and extends radially or nearly so to the pipe axis. Said pockets furthermore extend from the bottoms 14 of triangular shaped recesses 15 extending from the adjacent ends of the pipe unit. A pocket 13, moreover, is located in proximity of a recess end 16 from which the side walls 17 extend in diverging directions to the adjacent end of the pipe unit.

The number of reinforcing rods 11 and the associated pockets 13 and recesses 15 employed in a pipe unit depends principally upon the diameter of the pipe, its length and the thickness of the pipe wall. With pipe of large diameters the recesses and pockets are advantageously located in the outer periphery except at the bottom when they are desirably located in the inner periphery of the pipe, as shown in Fig. 2.

For joining pipe units together I provide couplings for the companion recesses and pockets of the abutting units. Each of said couplings consists in a rod which is bent to afford ends 18 directed at approximately right angles to the central portion 19.

In laying a pipe the units thereof are placed in axial alinement so that the recesses 15 of one length or unit will communicate with the recesses of the adjoining units. The coupling rods are then introduced into each part of communicating recesses to have the coupling arms 18 extend into the respective pockets.

The unoccupied spaces within the recesses and pockets are then filled with a plastic material, denoted by 20 in Fig. 3, to embed the couplings for the purpose of firmly holding the latter in place and uniting the same to the pipe units. The filling material 20 furthermore serves to protect the couplings from corrosion.

From the foregoing it is apparent that said couplings constitute with the rods 11 elements of reinforcing members which, in effect, extend uninterruptedly from one end of a series of joined pipe units to the other end. By reason of the flaring or fan shape of the recesses 15 it is unessential that the axes of the adjacent recess should correspond and thus enable the pipe units to be joined by my couplings without the necessity of rotating the units to have the respective recesses in exact register, which is usually a difficult thing to do with the larger sizes of pipes.

What I claim is,—

1. A concrete pipe composed of tubular sections arranged in end to end abutting relation and having longitudinal reinforcing elements embedded therein, said elements being provided with looped extremities, said tubular sections being provided with substantially radial pockets extending through the loops of the reinforcing elements, said tubular sections being further provided in their peripheries with a plurality of relatively shallow recesses extending from said pockets to the adjacent end edges of the respective sections, and substantially U-shaped coupling elements having the arms thereof positioned in adjacent pockets of the adjoining pipe sections with the intermediate portions of the couping elements seated in the adjacent recesses of said sections.

2. A concrete pipe composed of tubular sections arranged in end to end abutting relation and having longitudinal reinforcing elements embedded therein, said being provided with looped extremities, said tubular sections being provided with substantially radial pockets extending through the loops of the reinforcing elements, said tubular sections being further provided in their peripheries with a plurality of relatively shallow recesses extending from said pockets to the adjacent end edges of the respective sections, and substantially U-shaped coupling elements having the arms thereof positioned in adjacent pockets of the adjoining pipe sections with the intermediate portions of the coupling elements seated in the adjacent recesses of said sections, said recesses being relatively wide and the arms of the coupling elements pivotally engaging in said pockets whereby the tubular sections may be joined when the pockets are out of alinement.

3. A concrete pipe composed of tubular sections arranged in end to end abutting relation and having longitudinal reinforcing elements embedded therein, said elements being provided with looped extremities, said tubular sections being provided with substantially radial pockets extending through the loops of the reinforcing elements, said tubular sections being further provided in their peripheries with a plurality of relatively shallow recesses extending from said pockets to the adjacent end edges of the respective sections, and substantially U-shaped coupling elements having the arms thereof positioned in adjacent pockets of the adjoining pipe sections with the intermediate portions of the coupling elements seated in the adjacent recesses of said sections, said recesses being relatively wide and the arms of the coupling elements pivotally engaging in said pockets whereby the tubular sections may be joined when the pockets are out of alinement, the walls of said recesses diverging from the pockets to the end edges of the sections.

4. A concrete pipe composed of tubular sections arranged in end to end abutting relation and having longitudinal reinforcing elements embedded therein, said elements being provided with looped extremities, said tubular sections being provided with substantially radial pockets extending through the loops of the reinforcing elements, said tubular sections being further provided in their peripheries with a plurality of relatively shallow recesses extending from said pockets to the adjacent end edges of the respective sections, and substantially U-shaped coupling elements having the arms thereof positioned in adjacent pockets of the adjoining pipe sections with the intermediate portions of the coupling elements seated in the adjacent recesses of said sections, said recesses being relatively wide and the arms of the coupling elements pivotally engaging in said pockets whereby the tubular sections may be joined when the pockets are out of alinement, the looped extremities of the reinforcing elements being entirely covered by the material of the sections.

5. A concrete pipe composed of tubular sections arranged in end to end abutting relation and having longitudinal reinforcing elements embedded therein, said elements being provided with looped extremities, said tubular sections being provided with substantially radial pockets extending through the loops of the reinforcing elements, said tubular sections being further provided in their peripheries with a plurality of relatively shallow recesses extending from said pockets to the adjacent end edges of the respective sections, and substantially U-shaped coupling elements having the arms thereof positioned in adjacent pockets of the adjoining pipe sections with the intermediate portions of the coupling elements seated in the adjacent recesses of said sections, said recesses being relatively wide and the arms of the coupling elements pivotally engaging in said pockets whereby the tubular sections may be joined when the pockets are out of alinement, said intermediate portions of the coupling elements lying within the plane of the peripheries of the tubular sections.

6. A concrete pipe composed of tubular sections arranged in end to end abutting relation and having longitudinal reinforcing elements embedded therein, said elements being provided with looped extremities, said tubular sections being provided with substantially radial pockets extending through the loops of the reinforcing elements, said tubular sections being further provided in their peripheries with a plurality of relatively shallow recesses extending from said pockets to the adjacent end edges of the respective sections, substantially U-shaped coupling elements having the arms thereof positioned in adjacent pockets of the adjoining pipe sections with the intermediate portions of the coupling elements seated in the adjacent recesses of said sections, said recesses being relatively wide and the arms of the coupling elements pivotally engaging in said pockets whereby the tubular sections may be joined when the pockets are out of alinement, said intermediate portions of the coupling elements lying within the plane of the peripheries of the tubular sections, and a uniting filling in the pockets and recesses covering said coupling elements.

Signed at Seattle, Washington, this 28th day of June, 1920.

WILLIAM M. WALKER.

Witnesses:
PIERRE BARNES,
C. A. K. ANDERSON.